UNITED STATES PATENT OFFICE.

RICHARD HERZ AND FRITZ SCHULTE, OF FRANKFORT-ON-THE-MAIN, AND WERNER ZERWECK, OF FECHENHEIM, NEAR FRANKFORT-ON-THE-MAIN, GERMANY, ASSIGNORS TO GRASSELLI DYESTUFF CORPORATION, OF NEW YORK, N. Y., A CORPORATION OF DELAWARE.

PROCESS FOR CONVERTING CYANNAPHTHALENE SULPHONIC ACIDS.

No Drawing. Application filed February 24, 1927, Serial No. 170,732, and in Germany May 17, 1926.

The present invention relates to an improved process for converting cyannaphthalene sulphonic acids, and to new reaction products produced thereby.

We have found, that if cyannaphthalene-sulphonic-acids, containing at least one sulphonic group in ortho or para position to the cyanic group, are treated with an alkaline acting agent at elevated temperatures, this sulphonic group, standing in ortho or para position to the cyanic group, is easily exchanged for other monovalent radicles.

The products of conversion, thus obtained correspond to the general formula:

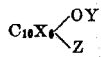

in which formula the group OY stands in ortho or para position to the group Z, the X's means hydrogen atoms, of which one or more may be replaced by a monovalent substituent. Y means hydrogen or an alkyl residue. Z the groups CN, $CONH_2$, and COOH.

The general formula shows the range of substances, obtained according to the conditions applied. By acting with milder acting alkaline agents, the cyan group of the employed cyannaphthalene-sulphonic-acids remains unattacked and hydroxy-cyannaphthalene-compounds are formed corresponding to the above formula, Y being hydrogen and Z being CN, by acting with stronger alkaline acting agents the cyan groups is saponified to the carboxyamid ($Z=CONH_2$ in this case) or to the carboxy group ($Z=COOH$ in this case) where as the sulphonic group is exchanged by hydroxyl (OH), when the applied alkaline acting agent is an aqueous caustic alkali, or by an alkoxy group, generally when applying caustic alkalies in presence of an alcohol. This latter reaction, by which an alkoxy group is introduced in the molecule, is a particularly remarkable one without any analogy in the naphthalene series. In this manner especially alkoxy-naphthalene-carboxyamids corresponding to the above formula, Z being $CONH_2$ and Y being an alkyl-residue, and hydroxy- and alkoxy-nathphoic acids are obtained corresponding to the above formula, Z being COOH and Y being hydrogen or an alkyl residue.

Under the term "alkaline acting agents" we understand caustic alkalies in presence of water or of an alcohol, acting either at ordinary pressure or in a closed vessel at elevated pressure. Under milder acting alkaline agents the following have been found especially suitable: basic alkaline salts such as sodium formate, acetate, borate, phosphate. Such agents, the caustic alkalies as well as the milder acting agents, may be used advantageously in the presence of inorganic or organic diluents in order to keep the mass homogeneous and easily liquid, such as paraffine, naphthalene, tertiary aromatic bases as dimethylaniline or N-alkyl-carbazol, higher fatty acids, glycerine or low melting salts.

The aforesaid reactions take place at remarkably low temperatures, namely at about 80–250° C., whereas Royle and Shedler and Butler and Royle (see Journ. of Chem. Soc. London, Vol. 123, pages 1641, 1649) must apply temperatures above 260 to 300° C. for exchanging the sulphonic group by the hydroxyl-group in the corresponding carboxynaphthalene sulphonic acids.

The starting materials for these reactions, namely the ortho- and para cyannaphthalene-sulphonic acids and their nuclear substitution products, particularly those containing a halogen or a further sulphonic-group in the nucleus, are obtained by diazotising the corresponding aminonaphthalene-sulphonic acids and treating the diazo compounds, thus obtained, with cuprous cyanide, according to Sandmeyer's reaction.

All products of conversion, derived therefrom, are important intermediates for the production of dyestuffs and pharmaceutical products.

In order to further illustrate our invention the following examples are given.

Example 1.

20 parts of the sodium salt of 2-cyan-naphthalene-1-sulphonic acid (obtainable from the 2-aminonaphthalene-1-sulphonic acid by Sandmeyer's reaction) are intimately mixed with about 40 parts of finely powdered caustic potash and about 150 parts of paraffine and the mixture is heated to about 140° C. while stirring. After some time the mass is cooled down, diluted with water and filtered. Upon acidifying the filtrate an evolution of sulphur dioxide occurs, and a colorless compound separates out forming long needles when recrystallized from dilute alcohol, melting at 179° C. The new compound combines with diazo compounds, forming azo dyestuffs. According to the result of comparative synthetic and analytic reactions it seems to correspond to the following formula:

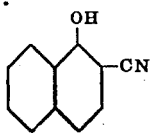

Instead of caustic potash also sodium acetate or formate with or without addition of paraffine or another suitable diluent may be used for the reaction. Also heating of the sodium salt of the cyannaphthalene-sulphonic acid by itself eventually with addition of sand or similar acting substances is sufficient for forming the cyannaphthol. This compound is converted into the corresponding 1-naphthol-2-carboxylic acid by treating it with alkaline saponifying agents, f. i. by heating it with dilute caustic alkalies. If the sodium salt of the 1-cyannaphthalene-4-sulphonic acid is treated in the same manner with a milder acting alkaline agent the corresponding 4-hydroxy-1-cyannaphthalene-compound is obtained.

*Example 2.*

4 parts of caustic potash and 1 part of water are heated in a suitable vessel until the mass is dissolved. Then 1 part of the sodium salt of 2-cyannaphthalene-1-sulphonic acid is added at about 150° C. The vessel is closed and then heating is continued under reflux. The temperature is slowly increased while stirring to about 200–220° C., and the mass is kept at this temperature until the evolution of ammonia ceases. After cooling down, the mass is dissolved in water and, filtered and upon acidifying, the 1.2-hydroxynaphthoic acid of the formula:

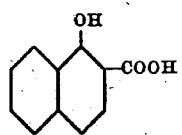

is separated. It melts at 186° C., and shows the properties mentioned in the literature.

When subjecting, in the same manner, the nuclear substitution products of the orthocyannaphthalene sulphonic acids, particularly those containing halogens or further sulphonic groups, to the action of alkaline agents, the corresponding derivatives of the products of conversion may be obtained. Thus, for instance, by treating 2-cyannaphthalene-3.6-disulphonic acid with caustic alkalies according to the conditions applied in this example a new acid is obtained, being probably 3-hydroxy-6-sulphonaphthalene-2-carboxylic acid; by carrying out the process under more vigorous conditions, particularly at more elevated temperatures, there is formed as end product of the reaction 3.6-dihydroxynaphthalene-2-carboxylic acid.

*Example 3.*

10 parts of caustic potash and 1 part of water are heated in a suitable vessel until the mass is dissolved. Then 2 parts of the sodium salt of 1-cyannaphthalene-4-sulphonic acid are added at about 160° C. The vessel is closed and then heating is continued under reflux. The temperature of the mass is increased as quickly as possible to about 200° C. and the mass is kept at this temperature for a short time. After cooling down, it is diluted with water and almost neutralized, filtered from some impurities, and the clear filtrate is acidified by means of hydrochloric acid. With an evolution of sulphur dioxide 1.4-hydronaphthoic acid of the formula:

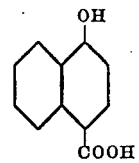

separates as colorless needles. This acid shows all the characteristic properties, and the melting point 184–185° C., described by Heller (Ber. d. Deutsch. Chem. Ges. vol. 45, 675).

1-cyannaphthalene-4-sulphonic acid may first be converted into the corresponding 4-sulpho-1-naphthoic acid for instance by heating it with a caustic potash solution of about 10% strength for some hours under reflux. It may be separated by acidifying and salting out the mass. By treating this acid with a caustic alkali in the same manner as described above at about 200° C., the 1.4-hydroxynaphthoic acid is formed, with an excellent yield, in a pure state.

When subjecting in the same manner the nuclear substitution products of 1.4-cyannaphthalene sulphonic acid such as the 6- and 7-sulpho derivatives, (obtainable by treating diazotised 1-naphthylamine-4.6- and 4.7-disulphonic acids (Dahl's acids II and III) with cuprous cyanide according to Sandmeyer's reaction) to the action of alkaline agents, the corresponding derivatives of the products of conversion may be obtained.

*Example 4.*

40 parts of caustic potash and 40 parts of methylic alcohol are heated for some time at about 110° C. At this temperature 15 parts of the sodium salt of 1-cyannaphthalene-2-sulphonic acid (obtained from the 1-amino-2-naphthalene-sulphonic acid; see Liebig's Annalen vol. 388, page 7) are added while stirring. The temperature of the mass is slowly increased to about 130–140° C. and the mass is kept at this temperature for a short time, until a test portion, when acidified, shows that the formation of a compound, insoluble in cold water and in dilute solutions of alkali carbonates, but soluble in ether, is finished. Then the mass is poured onto ice, the precipitate thus formed is filtered and washed with water. When recrystallized from water or benzene, the 2-methoxy-naphthalene-1-carboxyamide of the probable formula:

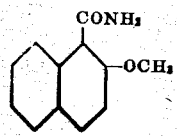

thus obtained, forms long colorless needles, melting at 189° C., as described in the literature. It has been formerly prepared by Gattermann (cf. Liebigs Annalen, vol. 244, page 75) in a complicated manner, unfit for technical purposes, by reacting with urea chloride and aluminium chloride on β-naphtholether.

When using caustic potash in the presence of ethylic-or butylic-alcohol in this process the corresponding ethoxy- and butyloxy-compounds are obtained.

Example 5.

40 parts of caustic potash and 25 parts of methylic alcohol are heated for some time at about 80° C. At this temperature 10 parts of the sodium salt of 2-cyannaphthalene-1-sulphonic acid are added. The temperature of the mass is increased to about 100–120° C., and the mass is kept for a short time at this temperature, until a test portion as described in the foregoing example, shows the formation of a compound insoluble in dilute solutions of alkali carbonates. Then the reaction mass is cooled down and diluted with water. Thereby a precipitate, which is insoluble in alkalies, is separated out. It is filtered and washed with water.

The new compound, being probably 1-methoxynaphthalene-2-carboxy-amide of the formula:

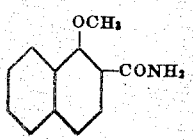

crystallizes from water or dilute alcohol as long colorless needles, melting at 156–157° C.

By saponifying the new compound with alkaline acting agents.—for instance, by heating it with a dilute caustic soda solution, preferably with addition of alcohol, until the evolution of ammonia ceases,—it is converted into the corresponding 1-methoxy-naphthalene-2-carboxylic-acid, which forms, when recrystallized from dilute alcohol, bright needles, melting at 127° C., as described in the literature (see Hübner. Monatshefte für Chemie, vol. 15, page 735).

When using other aliphatic alcohols for the process the corresponding alkoxy derivatives are formed. The same reaction takes place when using benzyl alcohol or also aromatic phenol. With polyvalent alcohols such as glycol the corresponding derivatives are formed.

Example 6.

1 part of the sodium salt of 1-cyannaphthalene-4-sulphonic acid is added at about 95° C., to a mixture of 4 parts of caustic potash and 6 parts of methylic-alcohol. Then the mixture is heated under reflux for some hours until a test portion as described in example 4 shows that the formation of a compound, insoluble in dilute solutions of alkali carbonates, is finished. After cooling down, the mass is diluted with water and the separated 4-methoxy-1-naphthamide of the formula:

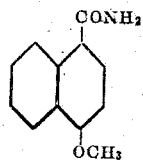

is isolated by filtration. It has the properties described in the literature (cf. Gattermann, Liebigs Annalen, vol. 244, page 73, who prepared it in a complicated manner, unfit for technical purposes by reacting with urea-chloride and aluminium-chloride on α-naphtholether).

When recrystallized from dilute alcohol it is obtained as colorless crystals, melting at 237° C. It is insoluble in cold alkalies; when heated with caustic alkaline solutions it is converted into the corresponding carboxylic acid.

When, in this process, the temperature of reaction is increased to about 120° C. (by partly distilling off the alcohol,) evolution of ammonia begins; after heating the mass for some hours at this temperature, until a test portion, when acidified, shows that the formation of a compound, easily soluble in dilute solutions of alkali carbonates, is finished, the formed 4-methoxy-1-naththoic acid of the formula:

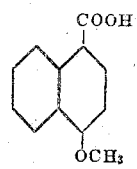

may be separated out by diluting the mass with water and acidifying it. The said product is easily soluble in alkalies, and exhibits a melting point of 239° C., when recrystallized from dilute alcohol (cf. Gattermann, l. c.).

It may also be obtained by subjecting the above mentioned 1-cyannaphthalene-4-sulphonic acid (see exampde 3) to the process described in the present example.

*Example 7.*

If, instead of methylic-alcohol, ethylic-alcohol, is used and the process is otherwise carried out as described in the foregoing example, 4-ethoxy-1-naphthamide and 4-ethoxy-1-naphthoic-acid are obtained, having the properties described in the literature (cf. Gattermann, l. c.). The 4-ethoxy-1-naphthamide crystallizes from dilute alcohol as colorless needles, melting at 244° C. It is insoluble in cold alkalies; when heated with a caustic alkaline solution the corresponding acid is formed. This 4-ethoxy-1-naphthoic-acid crystallizes from dilute alcohol as colorless needles, melting at 214° C. It is easily soluble in alkalies.

*Example 8.*

When using n-butylic alcohol instead of methylic alcohol and carrying out the reaction otherwise as described in the foregoing examples, at first 4-n-butyloxy-1-naphthamide of the formula:

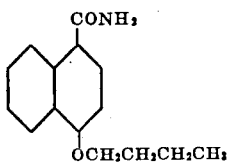

is obtained. The new compound crystallizes from spirit in silver shining needles, melting at 250° C.

By increasing the temperature of the reaction, the corresponding 4-n-butyloxy-1-naphthoic acid of the formula:

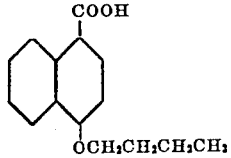

is obtained, being also a new compound, crystallizing from spirit as colorless needles and melting at 208° C.

In an analogous manner alkyloxy-compounds of higher fatty alcohols may be produced.

Among the products of conversion, derived from ortho- and para-cyannaphthalene solphonic acids, herein described, the hydroxynaphthoic-acids obtainable according to the aforesaid reaction with an excellent yield and in a pure state are already known in the literature, whereas the hydroxycannaphthalene-compounds, obtainable as intermediates by this reaction, are new bodies.

The alkoxynaphthamides and alkoxy-naphthoic-acids are new compounds with the exception of the following, which have been prepared in a complicated manner, unfit for technical purposes, as stated above:

1) 2-methoxy-1-naphthamide, (Liebigs Annalen, vol. 244, page 75).

2) 2-ethoxy-1-naphthamide, (l. c., page 75).

3) 4-methoxy-1-naphthamide, (l. c., page 73).

4) 4-ethoxy-1-naphthamide, (l. c., page 73).

5) 2-methoxy-1-naphthoic acid (Bulletin/3/, vol. 17, page 311).

6) 2-ethoxy-1-naphthoic acid, (Comptes rendus, vol. 136, page 618).

7) 1-methoxy-2-naphthoic acid (Monatshefte für Chemie, vol. 15, page 735).

8) 4-methoxy-1-naphthoic acid (Liebigs Annalen, vol. 244, page 73).

9) 4-ethoxy-1-naphthoic acid, (l. c., page 73).

Therefore we do not claim the bodies, specified under No. 1–9 as new compounds.

We claim:

1. The process which comprises treating with an alkaline acting agent a compound of the general formula

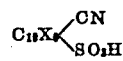

wherein the X's represent hydrogen atoms of which one or more may be replaced by a monovalent substituent and wherein the cyanogen and the sulphonic acid groups stand in ortho or para position to each other.

2. The process which comprises treating with an alkaline acting agent at a temperature of from about 80° to about 250° C. a compound of the general formula

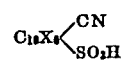

wherein the X's represent hydrogen atoms of which one or more may be replaced by a monovalent substituent and wherein the cyanogen and the sulphonic acid groups stand in ortho or para position to each other.

3. The process which comprises treating with an alkaline acting agent at a temperature of from about 80° C. to about 150° C. a compound of the general formula

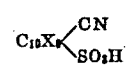

wherein the X's represent hydrogen atoms of which one or more may be replaced by a monovalent substituent and wherein the cyanogen and the sulphonic acid groups stand in ortho or para position to each other.

4. Process which comprises treating 2-cyannaphthalene-1-sulphonic acid with caustic potash in the presence of paraffine at a temperature of about 140° C., and precipitating the reaction product by acidifying the diluted reaction mass.

5. As new products the compounds of the general formula

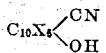

wherein the X's represent hydrogen atoms of which one or more may be replaced by a monovalent substituent and wherein the cyano group stands in ortho or para position to the hydroxyl group, said products being in the dry state colorless crystalline powders soluble in alkalies and capable of combining with diazo compounds.

6. As a new product the compound of the probable formula:

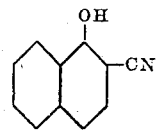

forming long needles melting at 179° C. when recrystallized from dilute alcohol, and being capable of combining with diazo compounds.

In testimony whereof, we affix our signatures.

RICHARD HERZ.
FRITZ SCHULTE.
WERNER ZERWECK.